UNITED STATES PATENT OFFICE.

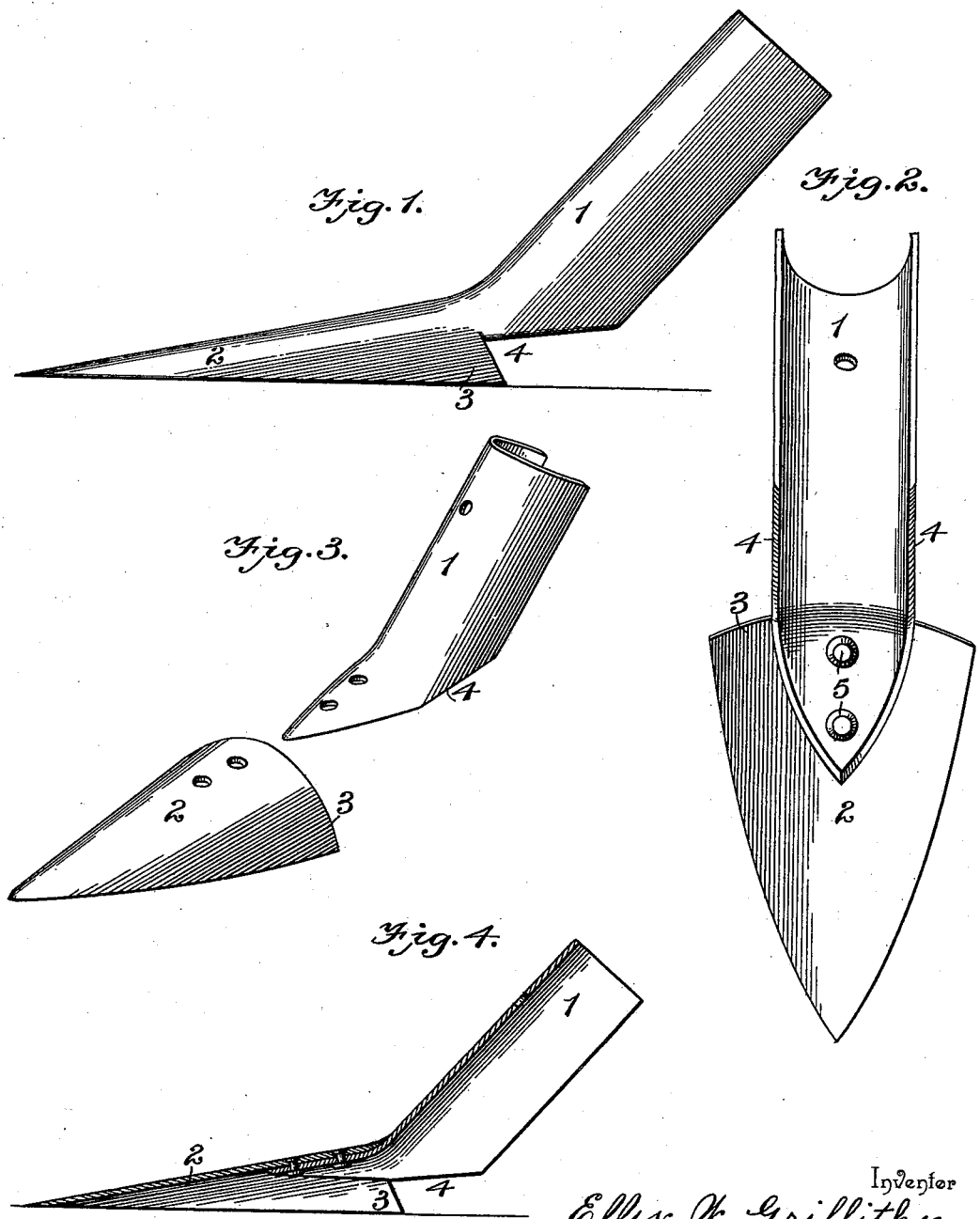

ELLIS W. GRIFFITHS, OF GALVA, KANSAS.

SHOE FOR HOE-DRILLS.

SPECIFICATION forming part of Letters Patent No. 594,528, dated November 30, 1897.

Application filed May 29, 1897. Serial No. 638,751. (No model.)

*To all whom it may concern:*

Be it known that I, ELLIS W. GRIFFITHS, a citizen of the United States, residing at Galva, in the county of McPherson and State of Kansas, have invented a new and useful Shoe for Hoe-Drills, of which the following is a specification.

When sowing grain, the best results are secured by depositing the seed in a comparatively wide furrow, thereby obviating crowding and loosening the ground, so as to admit of the roots spreading and producing stout stalks. Again, by covering the seed with mellow earth the chances for a large harvest are increased.

This invention purports to meet the above conditions by providing a shoe or foot to be fitted to hoe-drills and which will be of simple construction, light draft, loosen the soil, cut a comparatively wide furrow, permit the mellow soil to fall upon the seed in the rear of the point, and which will be comparatively light, effective, and not liable to derangement.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a side elevation of a shoe or foot for hoe-drills constructed in accordance with this invention, the shank and point being integrally formed of a piece of sheet-steel or other metal suitable for the purpose. Fig. 2 is a view of the shoe or foot inverted and showing its shank and point separately formed and secured together, so as to be separable. Fig. 3 is a perspective view showing the component parts separated. Fig. 4 is a central longitudinal section.

Corresponding and like parts are referred to in the following description and indicated in the several views of the drawings by the same reference-characters.

Inasmuch as the hoe-drills vary in length, the shoes or feet will have their shanks of different length to adapt them to the particular style of hoe-drill for which they are designed, and the curvature of the shank will differ to approximate the cross-sectional outline of the hoe-drill to which the shoes are to be applied.

The shoe or foot comprises a shank 1 and a point 2, which may be integrally formed or constructed of separate parts and bolted, riveted, or otherwise secured together, so as to admit of the point being replaced by a new one when worn or disabled for further service. When integrally formed, the shank and point are struck from a single piece of sheet material, as steel, and are given the shape illustrated, whereby the shank is curved between its longitudinal edges and the point is concavo-convex, the concave side being lowermost and facing the ground. The point 2 approximates the outline of an arrow-head, and its longitudinal edges are slightly curved and in the same plane, which is parallel with the surface of the ground when the shoe is placed in working position. The rear or wider end of the point projects beyond the sides of the shank 1, as shown at 3, forming in effect shoulders or wings, which are essential to the efficiency of the device. In the event of the point being separate from the shank its rear edge is beveled to a knife-edge at an intermediate point to secure a smooth joint with the shank, so that the earth may slide over the point and upon the shank without meeting with any obstruction which would impede the advance of the shoe and increase the draft.

The shank 1 is curved between its longitudinal edges, the curvature depending upon the outline of the hoe-drill to which the shoe is to be fitted, and the length of the shank depending upon the character and style of the hoe-drill for which the shoe is designed. The shank is of less width than the spread of the rear or heel portion of the point, and the lower part of its side portions is cut away, as indicated at 4, whereby a space is provided at each side of the shank in the rear of the shoulders or wings 3 to admit of the mellow soil falling upon the seed deposited in the furrow. When the shank is separate from the point, its lower end is made tapering and is formed with openings to register with corresponding openings in the point, and through which openings suitable fastenings 5 are passed for connecting the parts in a substantial manner. By having the shank and point separately formed the point can be replaced when worn or crippled at a comparatively slight cost, and the same shank may be used with different-sized points, as will be readily understood.

The shoe constructed substantially as set forth is detachably fitted to a hoe-drill in any desired manner, the upper portion of the shank being apertured, as indicated, to receive a bolt or fastening. The point is disposed with reference to the shank so as to readily penetrate the soil and cut a trench or furrow, into which the seed to be planted is dropped, and, as previously stated, the loose and mellow soil riding over the shoulders or wings 3 will pass under the cut-away sides of the shank and cover the seed in advance of the ordinary coverers, whereby the tendency for a large crop is rendered more probable. The concave side of the point facing the soil creates a vacuum or suction, which loosens the earth and prevents the packing which is the result when using furrow-openers having their lower side flat, as the extended surface sliding upon the soil compresses and compacts it, to the detriment of the crop, as demonstrated by practical tests.

The rear edges of the wings or shoulders 3 are straight and incline rearwardly at their lower or outer ends, and the lower edges of the side portions of the shank are likewise straight and correspond with lines drawn from the apex or penetrating end of the point through the latter, midway between its top and bottom edges, whereby the spaces in the rear of the wings or shoulders 3 and immediately below the sides of the shank are angling. This manner of providing the angling spaces admits of the seed reaching the bottom of the furrow and being covered by loose and mellow earth, the lumps being deflected to the sides.

If by reason of an unfavorable season or from other causes a farmer is unable to prepare the soil for the seed in the usual manner by plowing the ground, he can with this point plow up the ground and plant the seed at the same time, as it operates and runs as a plow or lister, and in sections of the country where the ground is plowed easily and the volunteer wheat, &c., causes trouble these points will plow up and kill the volunteer in the wheat rows, and what is left between the rows will protect the sowed wheat from wind and winter killing, saving great labor in harrowing or cultivating up the volunteer, so as to have the soil in shape to drill the seed in.

Having thus described the invention, what is claimed as new is—

1. A shoe or foot for hoe-drills comprising an arrow-shaped point concavo-convex in transverse section and having its longitudinal edges curved, and a shank curved between its longitudinal edges and of less width than the spread of the rear or heel portion of the point, whereby the projecting end portions form shoulders or wings whose rear edges are straight and incline rearwardly at their outer lower ends, and having the side portions of the shank cut away at their lower ends on straight lines drawn from the apex of the point and passing midway between its top and bottom edges, as shown, forming angling spaces immediately in the rear of the shoulders and below the side portions of the shank, substantially as shown.

2. A foot or shoe for hoe-drills comprising a concavo-convex arrow-shaped point having an intermediate portion at its rear edge beveled upwardly, a shank curved between its longitudinal edges and having its lower end tapering and bent forwardly to snugly fit the concave side of the point and the intermediate beveled portion of the rear edge, said shank being of less width than the spread of the point at its rear or heel, whereby shoulders or wings are provided whose rear edges are straight and incline rearwardly and outwardly, and the said shank having the lower ends of its sides cut away on straight lines drawn from the apex of the point and passing midway between its top and bottom edges as shown, forming angling spaces immediately in the rear of the shoulders of the point and below the side portions of the shank, substantially as shown for the purpose specified.

In testimony that I claim the foregoing as my own I have hereto affixed my signature in the presence of two witnesses.

ELLIS W. GRIFFITHS.

Witnesses:
CHAS. CRILLY,
G. D. HODGE.